United States Patent [19]

Margraf

[11] 4,343,632

[45] Aug. 10, 1982

[54] GAS DUST-REMOVING FILTERS

[76] Inventor: Adolf Margraf, Am Schleplingsbach 46, Stadthagen, Fed. Rep. of Germany

[21] Appl. No.: 205,231

[22] Filed: Nov. 10, 1980

[30] Foreign Application Priority Data

Mar. 13, 1980 [DE] Fed. Rep. of Germany ....... 3009596

[51] Int. Cl.³ ............................................ B01D 46/02
[52] U.S. Cl. ............................... 55/341 HM; 55/379; 55/481; 55/484; 55/492; 55/499; 55/501; 55/506
[58] Field of Search ............... 55/341 HMB, 379, 481, 55/484, 501, 508, 492, 378, 422, 341 PC, 341 H, 499, 506; 210/455, 486, 329

[56] References Cited

U.S. PATENT DOCUMENTS

| 1,785,346 | 12/1930 | Hatch | 55/422 |
| 3,204,390 | 7/1965 | Heyl | 55/341 HMB |

FOREIGN PATENT DOCUMENTS

| 336120 | 4/1921 | Fed. Rep. of Germany | 55/422 |
| 935156 | 8/1963 | United Kingdom | 55/378 |
| 990587 | 4/1965 | United Kingdom | 55/341 HMB |

*Primary Examiner*—Kathleen J. Prunner

*Attorney, Agent, or Firm*—Balogh, Osann, Kramer, Dvorak, Genova & Traub

[57] ABSTRACT

A gas dust-removing or dedusting filter of the kind incorporating a filter casing, filter tubes or bags having a flattened oval cross-section, and internal spacing elements. The casing includes a vertical partition having perforations and dividing the casing into a pure or clean gas chamber and a gas dust-removing chamber. The tubes or bags are horizontally insertable into the dust-removing chamber through the perforations of the partition and are sealed at their open ends to the clean gas side of the partition while their closed ends are supported on the rear wall of the casing.

In accordance with the invention, parallel vertical guide members, each having a surface which slopes with respect to a rear wall of the casing, are secured to the inner side of the rear wall of the casing. One guide member is disposed between two adjacent filter tubes or bags. The filter tubes or bags rest on support bars adjacent the rear wall of the casing, which engage said guide members. Also, the projection of each sloping surface on the rear wall corresponds to the spacing between two adjacent filter tubes or bags. The guide members prevent or minimize twisting of the tubes or bags.

3 Claims, 4 Drawing Figures

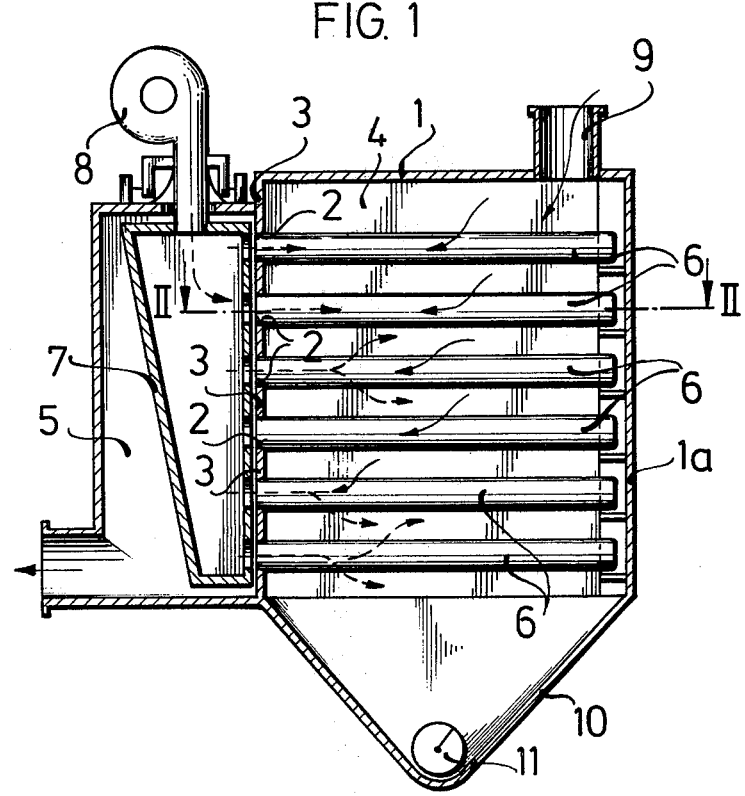

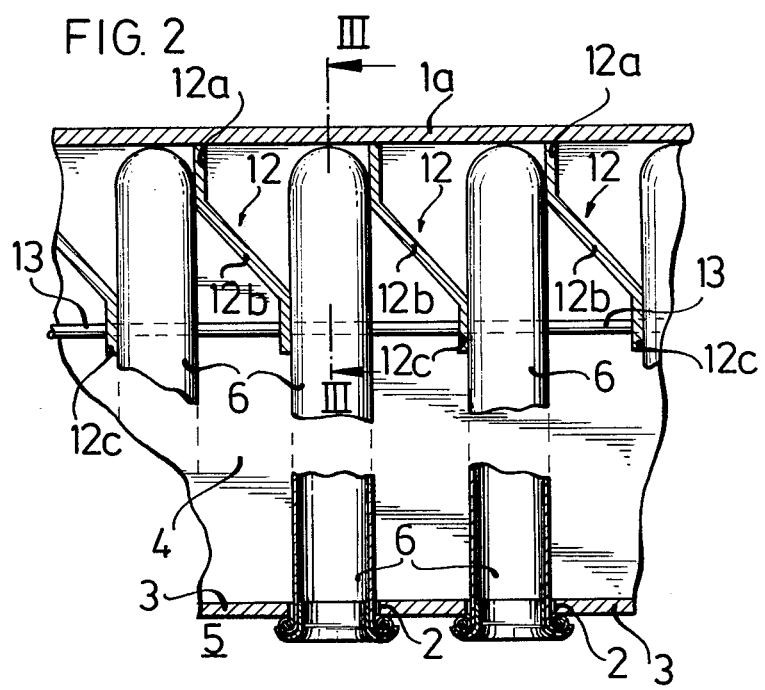
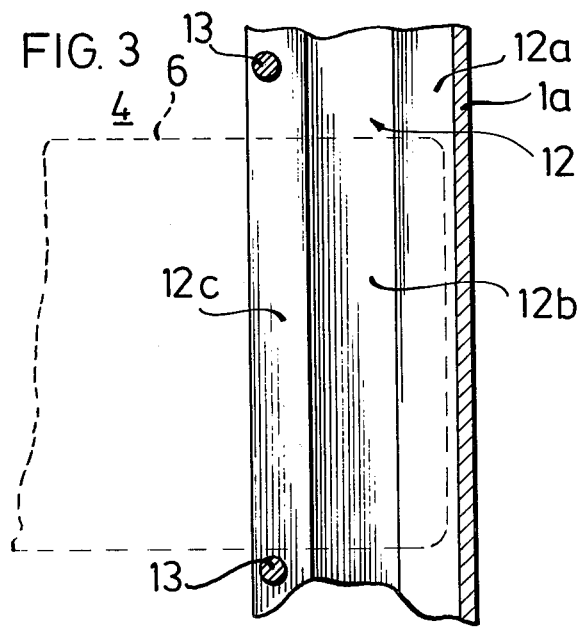

GAS DUST-REMOVING FILTERS

BACKGROUND OF THE INVENTION

The invention relates to a gas dust-removing filter of the kind incorporating filter tubes having a flattened oval cross-section, including spacing elements insertable through appropriately profiled perforations of a partition vertically dividing the filter casing into a clean gas chamber and a gas dust-removing chamber and being sealed at the clean gas side and supported at the free extremity on the rear wall of the casing.

Filter tubes or hoses for gas dust-removing filters of this kind are frequently provided with a spacing element, e.g. consisting of flattened-oval rings joining together longitudinal bearers, which keeps the plane and parallel tube surfaces apart during the dust-removing operation; due to their considerable length of 2 meters for example, these spacing elements may become twisted towards the open ends of their filter tubes or hoses in the dusty gas chamber, so that adjacent filter tubes come into contact and thereby impair the performance of the filter.

It is an object of the invention to locate and hold the ends of such long flattened-oval filter tubes in a fixed position with their major axis in a vertical disposition, so as to prevent or minimize twisting of the filter elements along their length.

SUMMARY OF THE INVENTION

Accordingly, in a gas dust-removing filter of the kind hereinabove set forth, the invention consists in that parallel vertical guide members each having a surface which slopes with respect to a rear wall of the casing the projection of which surface on to the rear wall of the casing corresponds to the spacing between two adjacent filter tubes which rest on supports adjacent the rear wall of the casing, are secured to the inner side of the rear wall.

Due to this construction, each filter element may be inserted horizontally from the clean gas side and through a perforation in a partition, into the dusty gas chamber by using an appropriate tool, until the lower edge of the filter element is placed on a transversely extending supporting bar close to the rear wall of the casing. By continued displacement, the end of the filter element comes into contact with the sloping areal portion of the corresponding guide member, slides along this sloping areal portion of the section joined at right angles to the rear wall, and at the other side by the delimiting edge or delimiting areal portion of the next adjacent guide member. The filter element thus can no longer be twisted along its length, since it is mounted in the perforation of the partition on the one hand, and at either side at the rear wall of the casing, on the other hand.

BRIEF DESCRIPTION OF THE DRAWINGS

In order that the invention may be more clearly understood, reference will now be made to the accompanying drawings which diagrammatically illustrate one embodiment thereof by way of example, and in which:

FIG. 1 shows a vertical cross-section through a gas dedusting filter,

FIG. 2 shows a top plan enlarged view (along the line II—II of FIG. 1) of a portion of chamber 4 in section, with portions of the filter tubes being broken away.

FIG. 3 shows a part-axial section along the line III—III of FIG. 2.

DETAILED DESCRIPTION OF THE PREFERRED EMBODIMENT

Figure 4:
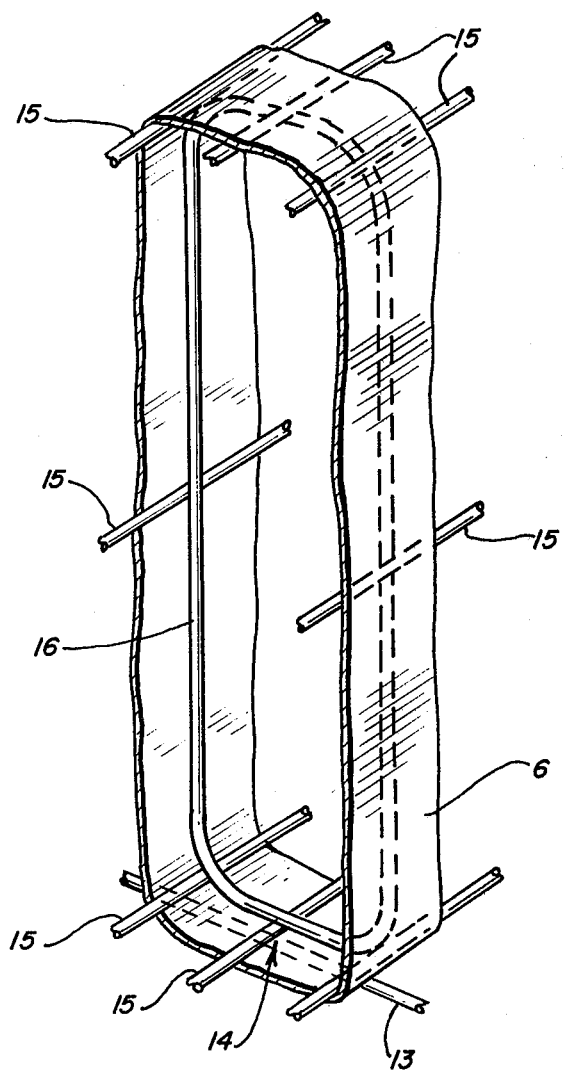
FIG. 4 shows a partially sectional view of a spacing element provided inside the filter tubes or bags of the invention.

Referring now to the drawings, a casing 1 of a gas dedusting filter is subdivided into a gas dedusting chamber 4 and a clean gas chamber 5 accessible via large ports, by means of a vertical partition 3 having perforations 2. Filter tubes, bags or hoses 6 of flattened oval cross-section, the major axis of the oval extending in the vertical direction, are secured to the partition 3, their open ends being secured in coincidence with the perforations 2 and being sealed at this clean gas end by means, for example, of flexible O-rings (see FIG. 2).

Within the clean gas chamber 5, a slotted nozzle 7 is displaced periodically back and forth along the partition and supplied with scavenging air from a blower 8, whereby the horizontal filter tubes 6 are cleaned by this scavenging air in counterflow to the flow of dusty gas entering at 9. The dust freed drops downwards into a dust collector hopper 10 and is extracted by means of a conveyor 11.

In accordance with the invention, the assembling of the filter tubes is facilitated by the following features, which prevent twisting of the long filter tubes 6 provided with a spacing element 14 (as shown in FIG. 4), spacing element 14 may be formed by parallel rods or bars 15 firmly joined together by means of rigid rings 16. To this end, parallel guide members 12 (FIG. 2) extending vertically or approximately vertically are fastened to the inner side of the rear wall 1a of the casing. These guides 12 extend away from the rear wall 1a at, or approximately at, right angles with an areal portion 12a and then merge into a sloping areal portion 12b the terminal edge of which is advantageously followed by a short areal portion 12c at right angles to the rear wall 1a. The projection of the areal portions 12b on the rear wall 1a corresponds to the spacing of two adjacent filter tubes 6. The filter tubes 6 are inserted horizontally from the clean gas side 5 through the perforations 2 of the partition (FIG. 2) and into the dusty gas chamber 4, and are then supported at a short distance in front of the rear wall 1a, e.g. on horizontal supporting bars 13 which pass through the guide members 12. Upon being pushed onward, the closed extremities or free ends of the filter tubes 6 impinge against the sloping areal portion 12b and slide therealong, until they are situated laterally with respect to the areal portions 12a in the direction towards the rear wall of the casing. In this end position, the tube ends are enflanked at the one side by the areal portions 12a and at the other side by the areal portions 12c of the next adjacent guide 12. The filter tubes are thereby held at both sides at their free closed ends on the one hand, and in the perforations 2 of the partition on the other hand, so that twisting of the elements 6 along their length is prevented. As previously stated the rims of the filter tubes 6 are moreover clamped fast in sealed manner (in any manner known per se) at the clean gas side 5 of the partition.

In accordance with the invention, the areal portion 12c of the guides 12 may be omitted, so that the free edge of the areal portion 12b forms the enflanking delimination of the filter tubes. In particular cases, the areal portion 12a also may be omitted, so that the sections 12 then merely comprise the sloping areal portion 12b.

I claim:

1. In a gas dust-removing filter of the kind including a filter casing provided with a vertical perforated partition which divides the casing into a clean gas chamber and a gas dust-removing chamber, and filter bags inserted horizontally into the gas dust-removing chamber through the perforations of said partition, each of said filter bags having an open end sealed at the clean gas side of said partition and a closed end supported on a rear wall of the casing, each of said filter bags being spaced apart from adjacent filter bags, said filter bags being provided with internal spacing elements for keeping apart the plane and parallel surfaces of each of said filter bags during the dust-removing operation, the improvement which comprises, parallel vertical guide members disposed in said gas dust-removing chamber and engaging the closed ends of said filter bags, each guide member being disposed between two adjacent filter bags, each guide member having a surface which slopes with respect to the rear wall of the casing and being secured to the rear wall of the casing, and support members which engage said guide members and are disposed so as to support the closed ends of said filter bags adjacent to the rear wall of the casing, the projection of said surface on the rear wall of the casing corresponding to the spacing between two adjacent filter bags, so that said filter bags are being held in a fixed position by said guide members and twisting thereof is substantially eliminated or reduced.

2. A filter according to claim 1, wherein said surface comprises a sloping areal portion, and each of said guide members extends with an areal portion from the rear wall of the casing approximately at right angles thereto and then merges into said sloping areal portion.

3. A filter according to claim 2, wherein said sloping areal portion merges into a second areal portion of each of said guide members which extends at right angles to the rear wall of the casing.

* * * * *